(12) United States Patent
Wang

(10) Patent No.: US 8,836,899 B2
(45) Date of Patent: Sep. 16, 2014

(54) METHOD FOR ATTACHING PROTECTION FILM OF LIQUID CRYSTAL DISPLAY MODULE AND PROTECTION FILM OF LIQUID CRYSTAL DISPLAY MODULE

(75) Inventor: Lan Wang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 191 days.

(21) Appl. No.: 13/515,804

(22) PCT Filed: Apr. 11, 2012

(86) PCT No.: PCT/CN2012/073784
§ 371 (c)(1),
(2), (4) Date: Jun. 13, 2012

(87) PCT Pub. No.: WO2013/149409
PCT Pub. Date: Oct. 10, 2013

(65) Prior Publication Data
US 2013/0258261 A1  Oct. 3, 2013

(30) Foreign Application Priority Data

Apr. 1, 2012 (CN) .......................... 2012 1 0096148

(51) Int. Cl.
*G02F 1/1333* (2006.01)
*G02F 1/13* (2006.01)

(52) U.S. Cl.
USPC .............................. 349/122; 349/58; 349/187

(58) Field of Classification Search
CPC .......................................... G02F 2001/133331
USPC ............................................ 349/58, 122, 187
See application file for complete search history.

(56) References Cited

U.S. PATENT DOCUMENTS

| | | | |
|---|---|---|---|
| 2008/0230177 A1* | 9/2008 | Crouser et al. | 156/275.5 |
| 2010/0231821 A1* | 9/2010 | Tsuji et al. | 349/58 |
| 2011/0007391 A1* | 1/2011 | Takahashi | 359/485 |

FOREIGN PATENT DOCUMENTS

| CN | 201054259 Y | 4/2008 |
|---|---|---|
| CN | 201622409 U | 11/2010 |

\* cited by examiner

*Primary Examiner* — Nathanael R Briggs
(74) *Attorney, Agent, or Firm* — Cheng-Ju Chiang

(57) ABSTRACT

The present invention provides a method for attaching a protection film of a liquid crystal display module, including the following steps: (1) providing a liquid crystal display module protection film and a liquid crystal display module, wherein the liquid crystal display module protection film includes a protection film body and adhesive layers formed at edges of the protection film body and the liquid crystal display module includes a backlight module, a liquid crystal display panel disposed on the backlight module, and a front bezel disposed on the liquid crystal display panel; (2) aligning the liquid crystal display module protection film with respect to the front bezel of the liquid crystal display module; and (3) attaching the adhesive layers of the liquid crystal display module protection film to the front bezel of the liquid crystal display module so as to cover the liquid crystal display panel.

7 Claims, 3 Drawing Sheets

1 — providing a liquid crystal display module protection film and a liquid crystal display module, wherein the liquid crystal display module protection film comprises a protection film body and adhesive layers formed at edges of the protection film body and the liquid crystal display module comprises a backlight module, a liquid crystal display panel disposed on the backlight module, and a front bezel disposed on the liquid crystal display panel 2 — aligning the liquid crystal display module protection film with respect to the front bezel of the liquid crystal display module 3 — attaching the adhesive layers of the liquid crystal display module protection film to the front bezel of the liquid crystal display module so as to cover the liquid crystal display panel

Fig. 1

METHOD FOR ATTACHING PROTECTION FILM OF LIQUID CRYSTAL DISPLAY MODULE AND PROTECTION FILM OF LIQUID CRYSTAL DISPLAY MODULE

BACKGROUND OF THE INVENTION

1. Field of the Invention

The present invention relates to the field of liquid crystal displaying, and in particular to a method for attaching a protection film of a liquid crystal display module and the protection film of a liquid crystal display module.

2. The Related Arts

Liquid crystal display (LCD) has a variety of advantages, such as compact device size, low power consumption, and being free of radiation, and is thus widely used. Most of the LCDs that are currently available in the market are backlighting LCDs, which comprise a liquid crystal display panel, a front bezel, and a backlight module. The liquid crystal display panel comprises two parallel glass substrate, liquid crystal interposed between the two parallel glass plates, and polarizers respectively attached to the two glass substrates. The front bezel covers over the liquid crystal display panel to fix the liquid crystal display panel to the backlight module. The backlight module provides a planar light source of homogeneous light illumination to the liquid crystal display panel.

Since the liquid crystal display panel is set at the topmost position of the liquid crystal display module, it can be easily scratched during transportation and warehouse stacking. Thus, currently, the liquid crystal display modules are provided with a protection film of liquid crystal display module attached thereto. The conventional way of attaching the protection film of liquid crystal display module is carried out by an operator who uses one hand to hold the protection film at a proper location on the liquid crystal display module and uses another hand to take a piece of adhesive tape from an adhesive tape dispenser and then applies the adhesive tape to fix the protection film to the liquid crystal display module. Such an attaching method suffers the following disadvantages:

(1) The operation is awkward to the operator for it is difficult to effect positional adjustment with one hand holding the liquid crystal display module protection film.

(2) It is time consuming to pick up a piece of adhesive tape from the adhesive tape dispenser and then applying the piece of adhesive tape to effect attaching.

(3) The adhesive tape and the adhesive tape dispenser increase the manufacture cost of the liquid crystal display module.

SUMMARY OF THE INVENTION

An objective of the present invention is to provide a method for attaching a protection film of a liquid crystal display module, in which a protection film having an adhesive layer is used and a body of the protection film can be directly attached to the liquid crystal display module by the adhesive layer to effect protection so that the operation is easy, is helpful for lowering manufacture cost, and saves working hour.

Another objective of the present invention is to provide a protection film of a liquid crystal display module, wherein an adhesive layer is provided at an edge of a body of the protection film so that the application of the protection film to a liquid crystal display module is convenient and the operation is easy.

To achieve the objective, the present invention provides a method for attaching a protection film of a liquid crystal display module, which comprises the following steps:

Step 1: providing a liquid crystal display module protection film and a liquid crystal display module, wherein the liquid crystal display module protection film comprises a protection film body and adhesive layers formed at edges of the protection film body and the liquid crystal display module comprises a backlight module, a liquid crystal display panel disposed on the backlight module, and a front bezel disposed on the liquid crystal display panel;

Step 2: aligning the liquid crystal display module protection film with respect to the front bezel of the liquid crystal display module; and Step 3: attaching the adhesive layers of the liquid crystal display module protection film to the front bezel of the liquid crystal display module so as to cover the liquid crystal display panel.

The liquid crystal display module protection film further comprises spacer sheets that are attached to the adhesive layers and Step 3 comprises peeling off the spacer sheets that are attached to the adhesive layers and then attaching the adhesive layers of the liquid crystal display module protection film to the front bezel of the liquid crystal display module.

The protection film body is rectangular in shape and the adhesive layers are arranged at four edges of the protection film body or at two opposite edges of the protection film body at locations close to opposite ends.

The adhesive layers are non-curable adhesive layers.

The spacer sheets comprise release paper.

The liquid crystal display panel comprises a first glass substrate and a second glass substrate that are arranged parallel with each other, liquid crystal interposed between the first and second glass substrates, and a first polarizer and a second polarizer respectively arranged at opposite sides of the first and second glass substrates. The liquid crystal display module protection film is attached by the adhesive layers to the front bezel to cover the first polarizer.

The present invention also provides a protection film of a liquid crystal display module, which comprises a protection film body, adhesive layers that are formed at edges of the protection film body, and spacer sheets attached to the adhesive layers.

The adhesive layers are non-curable adhesive layers.

The protection film body is rectangular in shape and the adhesive layers are arranged at four edges of the protection film body or at two opposite edges of the protection film body at locations close to opposite ends.

The spacer sheets comprise release paper.

The efficacy of the present invention is that the present invention provides a method for attaching a protection film of a liquid crystal display module, which through using and attaching a liquid crystal display module protection film that comprises adhesive layers arranged at edges, effect protection of the liquid crystal display panel. The attaching method eliminates the need of adhesive tapes and adhesive tape dispensers that are required in the known techniques so as to reduce the manufacture cost and avoid the problem of incorrect alignment due to only one single hand being allowed to hold the protection film that results from the need of picking up adhesive tape required in the known techniques, thereby eliminating the potential risk of re-alignment that causes a waste of work hour. The present invention also provides a protection film of liquid crystal display module, which comprises adhesive layers arranged at edges of a protection film body to make the use of liquid crystal display module protection film convenient and the operation easy.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings:

FIG. 1 is a flow chart showing a method for attaching a protection film of a liquid crystal display module according to the present invention;

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 2:
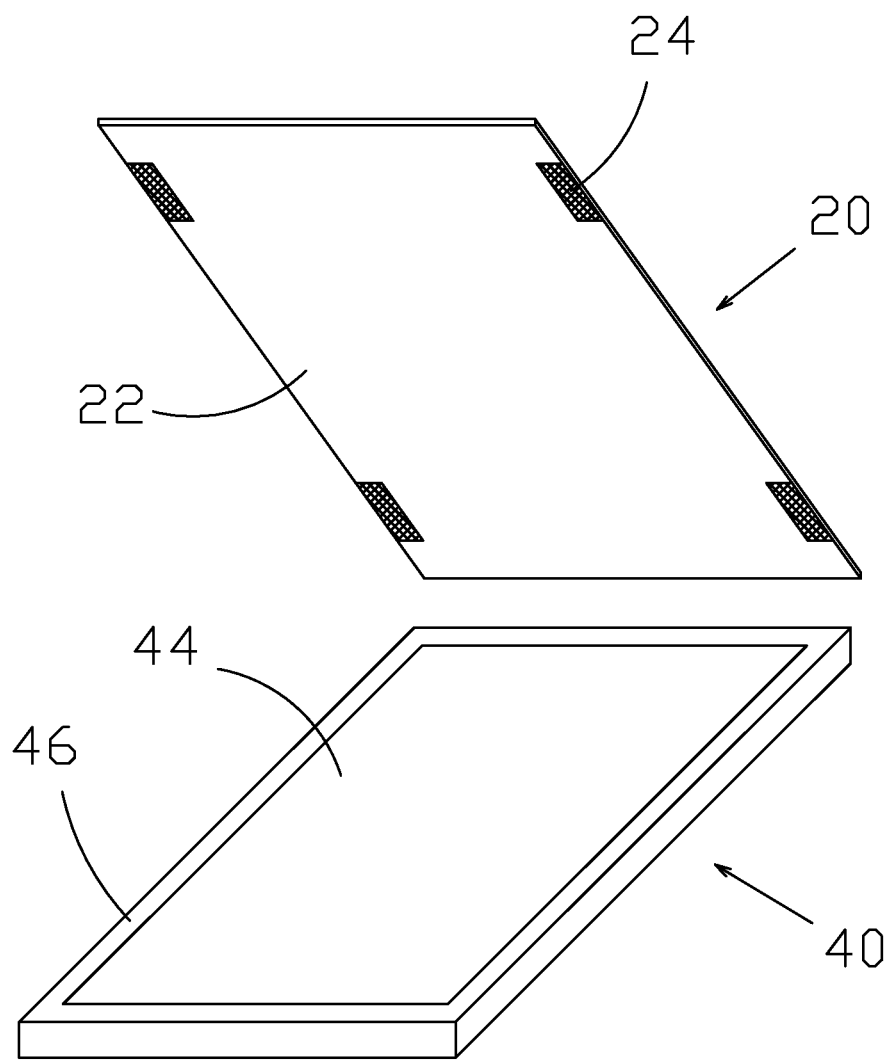
FIG. 2 is a perspective view showing the liquid crystal display module protection film and a liquid crystal display module according to the present invention.
Figure 3:
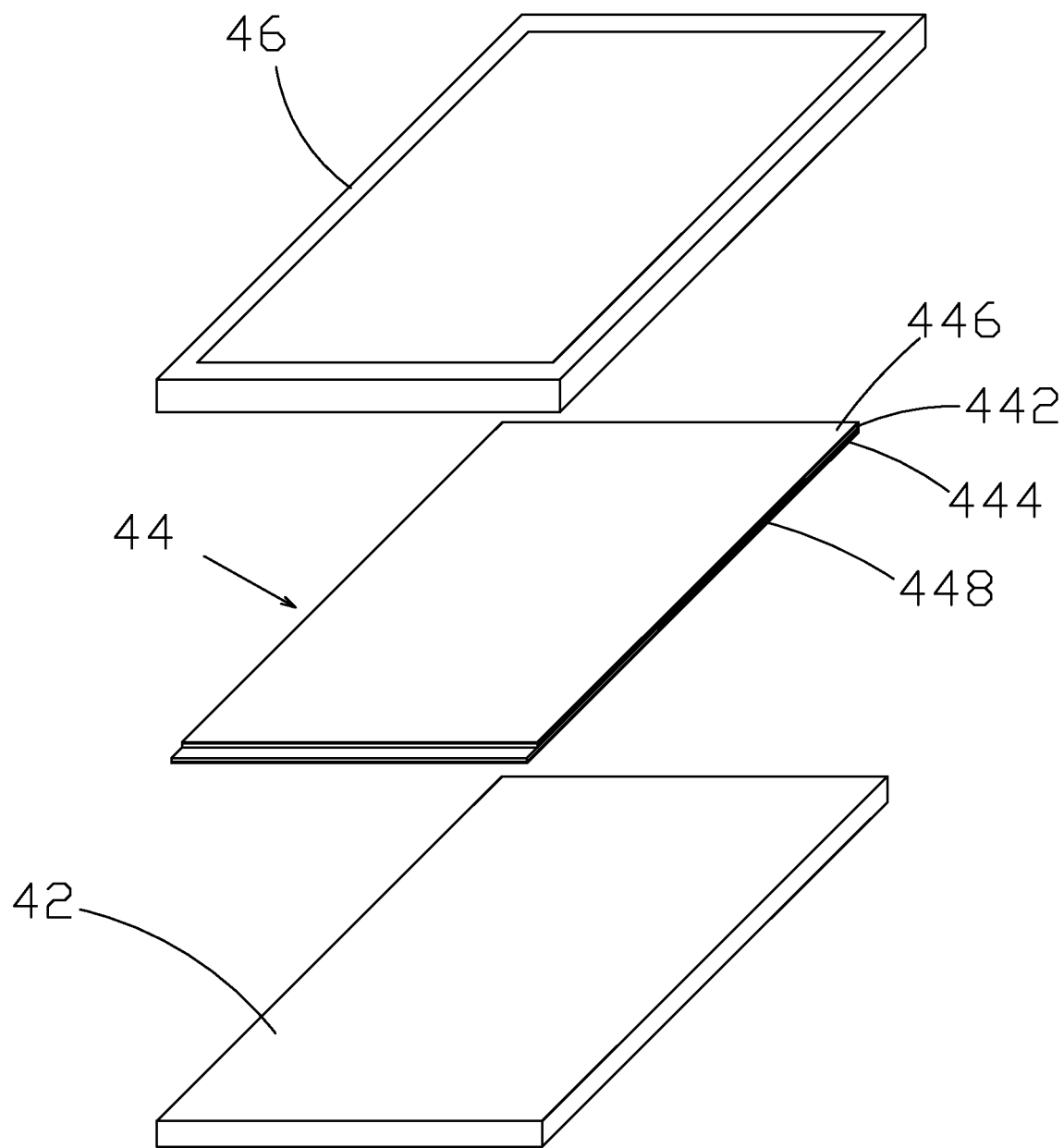
FIG. 3 is an exploded view of the liquid crystal display module shown in FIG. 2.

Referring to FIG. 1, in combination with FIGS. 2 and 3, the present invention provides a method for attaching a protection film of a liquid crystal display module, which comprises the following steps:

Step 1: providing a liquid crystal display module protection film 20 and a liquid crystal display module 40, in which the liquid crystal display module protection film 20 comprises a protection film body 22 and adhesive layers 24 formed at edges of the protection film body 22 and the liquid crystal display module 40 comprises a backlight module 42, a liquid crystal display panel 44 disposed on the backlight module 42, and a front bezel 46 disposed on the liquid crystal display panel 44.

The protection film body 22 is rectangular in shape. The adhesive layers 24 are arranged at four edges of the protection film body 22 or at two opposite edges of the protection film body 22 at locations close to opposite ends. The adhesive layers 24 are non-curable adhesive layers.

The liquid crystal display module protection film 20 further comprises spacer sheets (not shown) that are attached to the adhesive layers 24. The spacer sheets can be pieces of release paper that provide protection to the adhesive layers 24. The spacer sheets are removed in time of use in order to allow the adhesive layers 24 to effect attachment. Preferably, the combination of the adhesive layers 24 and the spacer sheets are pieces of double-sided adhesive tape, which are easy to handle and are of low cost. The release paper used here can be replaced by release films.

The liquid crystal display panel 44 comprises a first glass substrate 442 and a second glass substrate 444 that are arranged parallel with each other, liquid crystal (not shown) interposed between the first and second glass substrates 442, 444, and first and second polarizers 446, 448 respectively arranged at opposite sides of the first and second glass substrates 442, 444.

Step 2: aligning the liquid crystal display module protection film 20 with respect to the front bezel 46 of the liquid crystal display module 40.

Step 3: attaching the adhesive layers 24 of the liquid crystal display module protection film 20 to the front bezel 46 of the liquid crystal display module 40 so as to cover the liquid crystal display panel 44.

Step 3 includes first peeling off the spacer sheets that are attached to the adhesive layers 24 and then attaching the adhesive layers 24 of the liquid crystal display module protection film 20 to the front bezel 46 of the liquid crystal display module 40, so that the liquid crystal display module protection film 20 is attached by the adhesive layers 24 to the front bezel 46 and covers the first polarizer 446 thereby protecting the first polarizer 446 from being scratched and damaged during transportation and warehouse stacking. Further, the adhesive layers 24 are attached to the front bezel 46 without direct contact with the first polarizer 446 so that the problem of cleaning the first polarizer 446 due to the adhesive layers 24 attaching the first polarizer 446 can be avoided to thereby further avoiding the problem of potentially scratching and damaging the first polarizer 446 in cleansing the first polarizer 446. Further, in carrying out the attaching operation, no operation of picking up adhesive tape that is required by the known techniques is necessary so that an operator is free to conduct operations with both hands, this being helpful in neatly aligning the liquid crystal display module protection film 20 and the liquid crystal display module 40.

Referring to FIG. 2, the present invention also provides a protection film 20 for a liquid crystal display module, which comprises a protection film body 22, adhesive layers 24 that are formed at edges of the protection film body 22, and spacer sheets (not shown) attached to the adhesive layers 24.

The protection film body 22 is rectangular in shape. The adhesive layers 24 are arranged at four edges or the protection film body 22 or at two opposite edges of the protection film body 22 at locations close to opposite ends. The adhesive layers 24 are non-curable adhesive layers.

The spacer sheets can be pieces of release paper that provide protection to the adhesive layers 24. The spacer sheets are removed in time of use in order to allow the adhesive layers 24 to effect attachment. Preferably, the combination of the adhesive layers 24 and the spacer sheets are pieces of double-sided adhesive tape, which are easy to handle and are of low cost. The release paper used here can be replaced by release films.

In summary, the present invention provides adhesive layers at edges of a protection film body to make the use of a liquid crystal display module protection film convenient and the operation easy and avoid the use of adhesive tapes and adhesive tape dispenser that are used in the known techniques so as to reduce the manufacture cost and avoid the problem of incorrect alignment due to only one single hand being allowed to hold the protection film that results from the need of picking up adhesive tape required in the known techniques, thereby eliminating the potential risk of re-alignment that causes a waste of work hour.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for attaching a protection film of a liquid crystal display module, comprising the following steps:

Step 1: providing a liquid crystal display module protection film and a liquid crystal display module, wherein the liquid crystal display module protection film comprises a protection film body and adhesive layers formed at edges of the protection film body and the liquid crystal display module comprises a backlight module, a liquid crystal display panel disposed on the backlight module, and a front bezel disposed on the liquid crystal display panel;

Step 2: aligning the liquid crystal display module protection film with respect to the front bezel of the liquid crystal display module; and Step 3: attaching the adhesive layers of the liquid crystal display module protection film to the front bezel of the liquid crystal display module so as to cover the liquid crystal display panel in a manner that the liquid crystal display panel is kept intact, whereby the liquid crystal display panel is intact after removal of the liquid crystal display module protection film.

2. The method for attaching a protection film of a liquid crystal display module as claimed in claim 1, wherein the liquid crystal display module protection film comprises spacer sheets that are attached to the adhesive layers and Step 3 comprises peeling off the spacer sheets that are attached to the adhesive layers and then attaching the adhesive layers of the liquid crystal display module protection film to the front bezel of the liquid crystal display module.

3. The method for attaching a protection film of a liquid crystal display module as claimed in claim 1, wherein the protection film body is rectangular in shape and the adhesive layers are arranged at four edges of the protection film body or at two opposite edges of the protection film body at locations close to opposite ends.

4. The method for attaching a protection film of a liquid crystal display module as claimed in claim 1, wherein the adhesive layers are non-curable adhesive layers.

5. The method for attaching a protection film of a liquid crystal display module as claimed in claim 2, wherein the spacer sheets comprise release paper.

6. The method for attaching a protection film of a liquid crystal display module as claimed in claim 1, wherein the liquid crystal display panel comprises a first glass substrate and a second glass substrate that are arranged parallel with each other, liquid crystal interposed between the first and second glass substrates, and a first polarizer and a second polarizer respectively arranged at opposite sides of the first and second glass substrates, the liquid crystal display module protection film being attached by the adhesive layers to the front bezel to cover the first polarizer.

7. A method for attaching a protection film of a liquid crystal display module, comprising the following steps:

Step 1: providing a liquid crystal display module protection film and a liquid crystal display module, wherein the liquid crystal display module protection film comprises a protection film body and adhesive layers formed at edges of the protection film body and the liquid crystal display module comprises a backlight module, a liquid crystal display panel disposed on the backlight module, and a front bezel disposed on the liquid crystal display panel;

Step 2: aligning the liquid crystal display module protection film with respect to the front bezel of the liquid crystal display module; and Step 3: attaching the adhesive layers of the liquid crystal display module protection film to the front bezel of the liquid crystal display module so as to cover the liquid crystal display panel in a manner that the liquid crystal display panel is kept intact, whereby the liquid crystal display panel is intact after removal of the liquid crystal display module protection film;

wherein the liquid crystal display module protection film comprises spacer sheets that are attached to the adhesive layers and Step 3 comprises peeling off the spacer sheets that are attached to the adhesive layers and then attaching the adhesive layers of the liquid crystal display module protection film to the front bezel of the liquid crystal display module;

wherein the protection film body is rectangular in shape and the adhesive layers are arranged at four edges of the protection film body or at two opposite edges of the protection film body at locations close to opposite ends;

wherein the adhesive layers are non-curable adhesive layers;

wherein the spacer sheets comprise release paper; and wherein the liquid crystal display panel comprises a first glass substrate and a second glass substrate that are arranged parallel with each other, liquid crystal interposed between the first and second glass substrates, and a first polarizer and a second polarizer respectively arranged at opposite sides of the first and second glass substrates, the liquid crystal display module protection film being attached by the adhesive layers to the front bezel to cover the first polarizer.

\* \* \* \* \*